United States Patent [19]

Seyffert

[11] 4,400,136
[45] Aug. 23, 1983

[54] CENTRIFUGAL PUMP IMPELLER ATTACHMENT

[75] Inventor: Kenneth W. Seyffert, Houston, Tex.
[73] Assignee: Sancor Pump Co., Houston, Tex.
[21] Appl. No.: 323,666
[22] Filed: Nov. 20, 1981
[51] Int. Cl.³ .............................................. F04D 29/20
[52] U.S. Cl. ................................ 415/140; 416/244 R; 403/259
[58] Field of Search ................ 192/101; 403/259, 320, 403/356; 415/9, 140; 416/244 R; 464/30, 33, 42

[56] References Cited
U.S. PATENT DOCUMENTS

| | | | |
|---|---|---|---|
| 232,926 | 10/1880 | Berkholz. | |
| 3,079,866 | 3/1963 | Walker | 416/244 X |
| 3,664,764 | 5/1972 | Davies | 416/224 |
| 3,904,301 | 9/1975 | Schroeder | 403/259 |

*Primary Examiner*—Harvey C. Hornsby
*Assistant Examiner*—Arthur D. Dahlberg
*Attorney, Agent, or Firm*—Vaden, Eickenroht, Thompson, Bednar & Jamison

[57] ABSTRACT

An improved centrifugal pump protected against reverse rotation injury. The pump has an impeller mounted upon a pump shaft within a casing. The impeller has a central hub mounted over a threaded portion on the shaft and seated against a shoulder. A tubular nut mounts onto the threaded portion of the shaft and within the hub of the impeller. A flange on the nut seats on the hub. Offcenter axial pins are secured in the hub and extend into openings in the flange to interconnect drivingly the impeller and pump shaft. Upon undesired reverse rotation of the pump shaft, the nut unthreads from the pump shaft until the pins withdraw from openings in the flange. Then, the nut spins off the shaft. Now, the pump shaft can rotate safely within the stationary impeller.

10 Claims, 3 Drawing Figures

CENTRIFUGAL PUMP IMPELLER ATTACHMENT

BACKGROUND OF THE INVENTION

1. Field of the Invention

This invention relates to centrifugal pumps, and more particularly, it relates to improvements therein for securing the impeller upon the pump shaft.

2. Description of the Prior Art

Centrifugal pumps are very useful machines and they have been used for many years in moving fluids. The centrifugal pumps have a casing forming a chamber with fluid inlet and outlet. An impeller is positioned in the chamber and rotated by a pump shaft. The pump shaft can be a part of a motor shaft or a separate shaft carried in its own bearing journals. In large centrifugal pumps, the separate pump shaft is usually employed. Various arrangements are used to secure the impeller to the pump shaft, but in any event, the impeller cannot move axially in the close confines of the chamber. Otherwise, injury to the casing and impeller will occur.

In some arrangements, the impeller directly, or by an integral nut, threads upon the end of the pump shaft of the centrifugal pump. When the pump shaft suffers reverse rotation, the impeller attempts to spin-off the pump shaft. However, the axial clearance is usually less than one-eighth inch between the impeller and casing. As a result, the impeller jams against the casing and is held against rotation relative to the spinning pump shaft. Now, the continued unthreading of the impeller on the pump shaft can force the pump shaft axially away from the casing. Usually, the pump shaft is forced from the casing and the bearing journals. Either of these results causes serious injury to the system.

It has been proposed to prevent the problems in centrifugal pumps from undesired reverse rotation of the pump shaft. For example, counterdirectional threading sleeves and shaft nuts have been designed to avoid this problem, e.g., see U.S. Pat. No. 3,904,301 which issued Sept. 9, 1975. However, these multi-thread locking systems are complex, expensive, require special machined parts and are not compatible with conventional pump shafts and impellers.

The present invention provides an improved centrifugal pump impeller attachment usuable with most conventional pump designs that does not require complex mechanical constructions. Further, this attachment provides a fail safe release of the impeller from the pump shaft so that reverse rotation accidents cannot cause injury to any part of the centrifugal pump.

SUMMARY OF THE INVENTION

In accordance with this invention, there is an improved centrifugal pump which has a casing with an annular chamber between fluid inlet and outlet. An impeller resides within the chamber and is mounted against a shoulder on a rotatable pump shaft. A nut is releaseably mounted upon a threaded portion of the pump shaft and holds the impeller against the shoulder. The impeller is interconnected with the pump shaft in non-rotatable assembly by a key means. The improvements include a central hub on the impeller, which hub forms an annulus about the pump shaft and carries a first face seated against the shoulder. The nut has a tubular body received in this annulus and threaded upon the threaded portion of the pump shaft. A radial flange on the nut seats against the other face of the hub. At least one offcenter longitudinal key is slidably received in axial openings in the flange and face of the hub.

In this embodiment reverse rotation of the pump shaft unthreads the nut until the key(s) withdraw from their openings and the nut spins-off of the pump shaft. Then, the pump shaft rotates freely relative to the stationary impeller.

DESCRIPTION OF THE DRAWINGS

In these drawings, the several figures have like elements and these elements will carry like numerals to simplify the description of the improved centrifugal pump.

DESCRIPTION OF PREFERRED EMBODIMENTS

Figure 1:
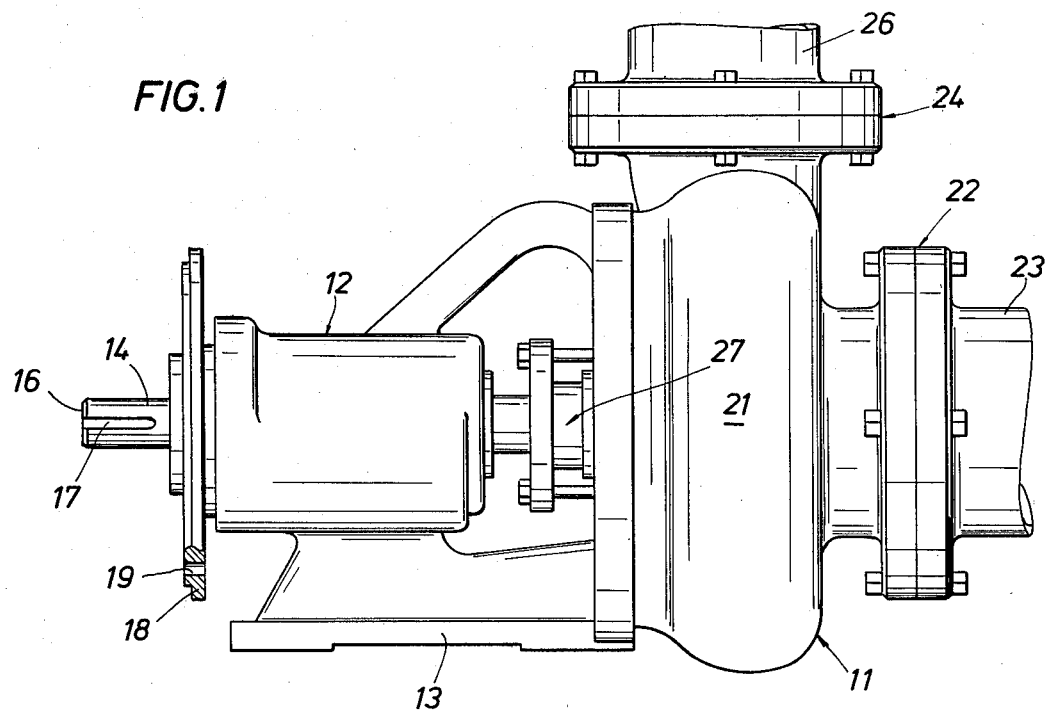
FIG. 1 is a pictoral view illustrating one embodiment of an improved centrifugal pump arranged according to the present invention.

Referring to FIG. 1, there is shown an improved centrifugal pump arranged with a novel impeller attachment. Although the centrifugal pump fluid end 11 is shown as a single end suction, radial flow type, the present improved attachment of impeller to pump shaft can be used on other types of centrifugal pumps such as the double suction, axial flow or multi-stage types.

More particularly, the pump fluid end 11 is shown in combination with a separate outboard bearing housing 12. However, the pump fluid end 11 can be used with a primemover carrying the impeller directly mounted to the motor shaft. The housing 12 has a base 13 for mounting the pump assembly in operative position, and it provides a bearing journal for a separate pump shaft 14. The shaft 14 is connectible at its outboard end 16 to a suitable prime mover, e.g., an electric motor. The shaft 14 usually carrying a key slot 17 to insure a non-slipping connection to the prime mover. A flange 18 with bolt holes 19 provides for a releasable mounting when a fluid motor is the prime mover. The housing 12 also may include internally a lubricant supply and oil seals to insure proper lubrication of the rotating shaft 14. The shaft 14 extends from the housing 12 into the pump fluid end 11.

The pump fluid end 11 has a body 21 which carries an inlet adapted to be connected to a source of fluid as by a flanged joint 22 to an inlet pipe 23. Also, the body carries an outlet adapted to be connected to the discharge of fluid as by a flanged joint 24 to an outlet pipe 26. A packing gland assembly 27 seals fluid tight the shaft 14 to the body 21.

Figure 2:
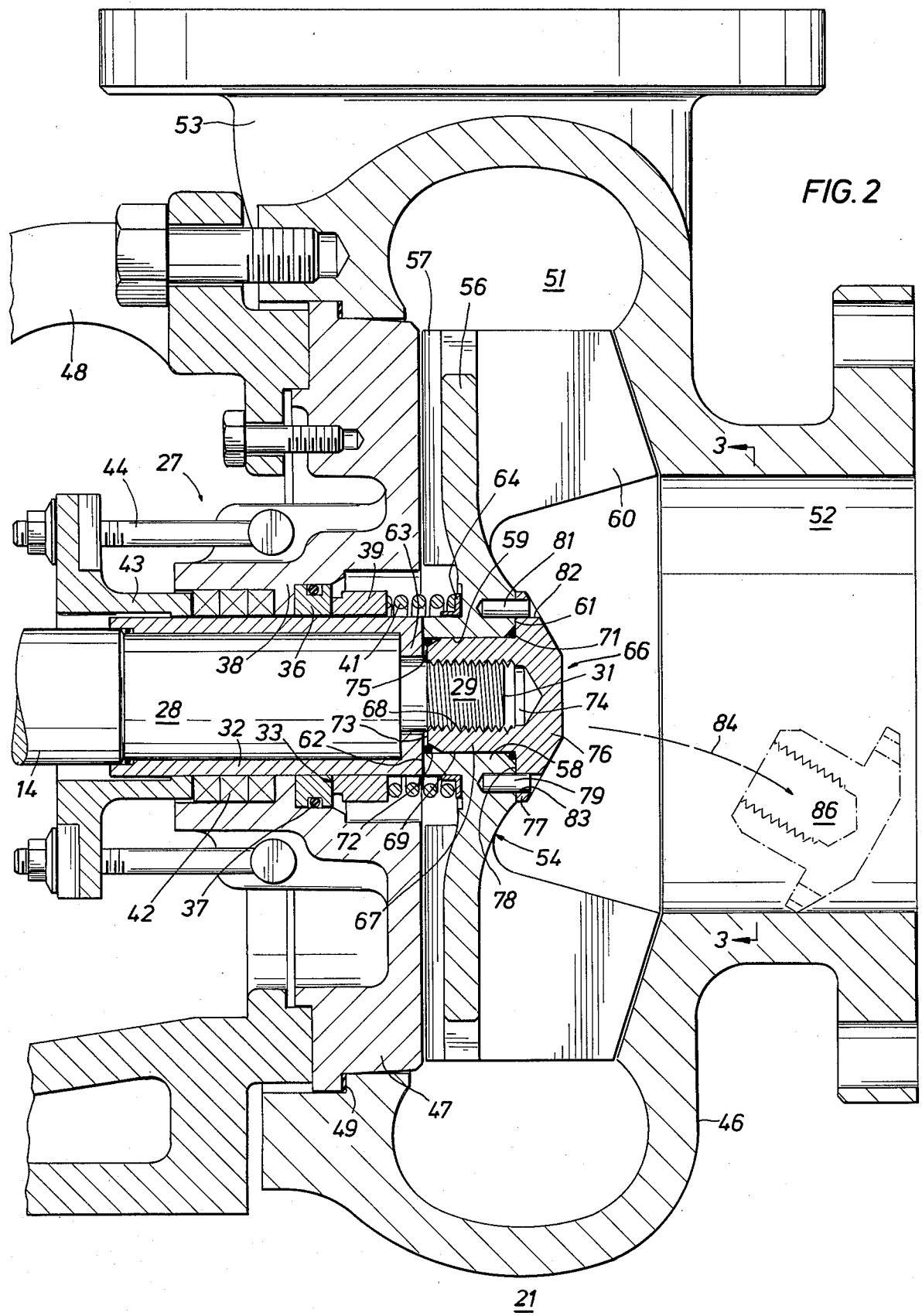
FIG. 2 is an enlarged vertical section taken through the pump of FIG. 1.

Referring now to FIG. 2, the body 21 of the pump fluid end 11, and improved impeller attachment is shown in detail. The shaft 14 has a reduced diameter section 28, and a threaded portion 29 adjacent its inboard end 31. An optional wear sleeve 32 is usually carried on shaft portion 29 which cooperates with the primary mechanical packing 33 and secondary packing 42 carried in the stuffing box assembly 27. The mechanical packing 33 can include a nonrotating seat 36 with an exterior groove carrying an O-ring 37 which forms a fluid tight seal to the stuffing box 38. A rotary element 39 is urged by a spring 41 into dynamic sealing engagement with seat 36. Resilient packer rings 42 are received in the stuffing box 38 and preloaded into fluid tight dynamic engagement with the rotatable shaft 14 by a packing gland 43. Jack screws 44 may be used to press inwardly the packing gland 43 against the packing rings 42 into a desired preloaded condition required for the fluid tight dynamic seal with the shaft 14. The secondary packing rings 42 are only loaded and used upon failure of the primary mechanical packing 33.

The body 21 is usually formed of a casing 46 which is bolted to a stuffing box cover 47 that can be integral with the assembly 27. Also, the bearing housing 12 can have frame members 48 that also are bolted onto both the casing 46 and cover 47. A ring gasket 49 seals the cover to the casing.

Generally, all centrifugal pumps have a separable cover and casing arrangement so that the impeller can be mounted and removed from the pump shaft during assembly, repair and servicing operations. The pump 11 has been described in conventional construction and other arrangements for the parts therein can be used with equal facility in the present improved impeller attachment to the pump shaft.

The casing 46 defines an annular chamber 51 that is in fluid communication to the suction inlet 52 and pressure outlet 53. An impeller 54 is positioned coaxially within the chamber 51. The impeller has a disc-like body 56 carrying a plurality of back vanes 57 and front vanes 60, which vanes may be straight or scroll-like configurations.

The impeller 54 has a hub 58 with a central cylindrical surface 59 defining a central opening coaxial with the threaded portion 29 of the shaft 14. The surface 59 is spaced from the threaded portion 29 forming an annulus therebetween. The hub 58 has end faces 61 and 62 that are surfaces normal to the rotational axis of the shaft 14. The face 62 engages an inturned shoulder or flange 63 formed on the optional wear sleeve 32. However, the shoulder 63 can be made directly upon the shaft 14 if sleeve 32 is omitted. This shoulder provides one axial limit to positioning of the impeller 54 within the chamber 51. A back-up ring 64 rests upon the hub 58 and supports one end of the spring 41 which is part of the primary mechanical packing assembly.

The vanes 57 and 60 have beveled surfaces which must be close to the opposing surfaces of the casing 46 and cover 47. The separation spacing between the vanes and adjacent body parts is only a small fraction of an inch, e.g., one-thirty second of an inch. Thus, the axial movement of the impeller 54 on the shaft 14 must be controlled during rotation otherwise the impeller or body parts can suffer serious injury.

The impeller 54 is secured integrally to the shaft 14 by an impeller nut 66. The nut 66 has a tubular body 67 carrying internal threads 68 which threadedly mounted onto the threaded portion 29 of the shaft 14. Also, the body 67 has an external cylindrical surface 69 that slides within the surface 59 of the hub 59 on the impeller 54. The nut 66 and hub 58 may carry beveled surfaces to accommodate O-rings 71 and 72 that form a fluid seal between the nut and hub. The nut 66 should not seat directly to positive limits in its threaded mounting on the shaft 14. Thus, the end 73 of the nut is spaced tightly by a cavity 75 from flange 63 and a cavity 74 is provided between the end 31 of shaft 14 and the inboard end 76 of the nut 66.

The nut 66 carries a stop surface such as a radial flange 77 that extends outwardly about the body 67 and has a face 78 seating against the face 61 of the hub 58. As a result, the nut 66 securely holds the hub 67 firmly seated against the flange or shoulder 63 on the shaft 14. Also, the nut 66 by the flange 77, or other stop surface, provides the positional limit against axial movement of the impeller 54 towards the suction end or inlet 52 of the pump.

The impeller 54 is preferably not directly secured onto the shaft 14 in a nonrotational mounting. Importantly, the impeller 54 is secured to the nut 66 by an axial movement released key mechanism. This key mechanism during proper directional rotation of the shaft 14 provides an integral connection to the impeller. Unintended or accidental reverse shaft rotation causes the key mechanism to axially separate and allows the shaft 14 to rotate freely within the hub 58 of the impeller.

It is preferred that this key mechanism be provided by one or more offcentered longitudinal keys that are slideably carried between the hub 58 and the nut 66. These keys may take a variety of forms. It is preferred that these keys have a length less than the thread length mounting the nut 66 on the shaft 14 so that the nut 66 while unthreading will be separated from the keys.

Figure 3:
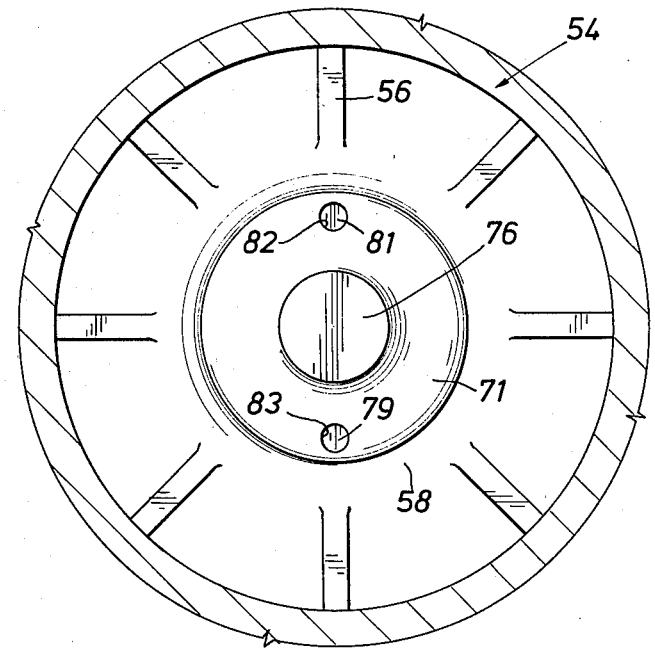
FIG. 3 is a partial end view of the pump shown in FIG. 2 and taken along lines 3—3.

As seen in FIGS. 2 and 3, these keys can be a plurality of pins 79 and 81 which are slideably received in axial openings 82 and 83 provided in the flange 77 of the nut 66. Preferably, the pins 79 and 81 provide a direct mechanical drive connection between the nut 66 and impeller 54. The nut 66 is threadedly mounted onto the shaft 14. Thus, normal rotation of the shaft 14 tightens the nut threaded mounting and integrally carries the impeller 54.

When the shaft 14 suffers reverse rotation, the nut 66 unthreads from the threaded portion 29 of the shaft 14. Concommittantly, the nut 66 is forced axially towards the suction end 52 until the pins 79 and 81 are withdrawn from openings 82 and 83 in the flange 77. The rotational inertia in the nut 66 and the rotational friction between surfaces 59 and 69 causes it to completely unthread and be released from the shaft 14. Then, the nut 66 falls into the suction inlet 52 of the casing 46. Once the impeller 54 is released from the nut 66, it quickly ceases to rotate because of the drag of the fluid in the chamber 51. The impeller 54 ultimately can rest with the vanes 60 against the adjacent surfaces of the casing 46. However, the shaft 14 freely spins within the hub 58. Thus, the only force continuing rotation of the impeller is inertia which is quickly and safely dissipated in the fluid within the pump 11 and frictional forces between the impeller 54 and casing 46.

The ultimate released position 86 of the nut 66 is shown in chain-lines and its travel path indicated by arrows 84. Since the pump fluid end 11 is not damaged by the reverse shaft rotation accident, the inlet pipe 23 is released at joint 24 to expose the suction end 52. Then, the nut 66 is rethreaded onto the threaded portion 29 of the shaft 14, and the pins 79 and 81 are indexed into the openings 82 and 83 of the flange 77. Once the nut 66 is seated firmly against the hub 58, the inlet pipe is reconnected and the pump 11 is returned to moving fluids. Obviously, the threaded mounting of the nut onto the shaft can be made by proper slow rotation of the shaft 14 or the nut and impeller, or both members.

The present improved centrifugal pump by the unique impeller attachment to the pump shaft provides a fail safe mechanism to protect the pump from injury by reverse shaft rotation and the mechanism is simple in construction and reusable.

From the foregoing, it will be apparent that there has been provided a novel centrifugal pump with improved impeller attachment which provides a convenient and safe means for avoiding injury to pump parts upon accidental pump shaft rotation. It will be appreciated that certain changes or alterations in the present improved centrifugal pump may be made without departing from the spirit of this invention. These changes are contemplated by and are within the scope of the appended claims which define the invention. Additionally, the present description is intended to be taken as an illustration of this invention.

What is claimed is:

1. In a centrifugal pump of the end suction type and having a casing, a rotatable pump shaft in the casing and aligned with the fluid inlet or impeller mounted on the pump shaft within the casing, and means for securing the impeller in a driving mounting on the pump shaft, the improvement comprising:
   (a) said pump shaft having a threaded portion between a shoulder and the end of said pump shaft adjacent the fluid inlet;
   (b) said impeller having a central hub with a cylindrical opening and end faces;
   (c) said hub mounted concentrically on said pump shaft with one end face resting against said shoulder and said central hub separated from said pump shaft by a cylindrical annulus;
   (d) a nut with an internal threaded opening mounted on said threaded portion of said pump shaft and extending into said cylindrical annulus between said hub and said pump shaft;
   (e) flange means on said nut seated against the other end face of said central hub; and
   (f) key means for interconnecting said nut and said impeller for concurrent rotation on said pump shaft and said key means axially separated by unthreading said nut leaving said impeller freely rotatable on said pump shaft.

2. The improved pump of claim 1 wherein said key means comprise at least one pin received securely offcenter within one of said nut and said impeller and each such pin received slideably within the other of said nut and said impeller.

3. The improved pump of claim 2 wherein a plurality of pins are employed with said pins being disposed about the axis of rotation of said pump shaft in a dynamically balanced disposition.

4. The improved pump of claim 1 wherein said central opening of said hub is spaced by an annulus about said pump shaft, and said nut carries an internally threaded body mounted on said thread portion of said pump shaft and said body is received within said central opening of said hub.

5. The improved pump of claim 4 wherein a fluid seal is carried within a groove formed between said hub, said body and said shoulder on said pump shaft.

6. The improved pump of claim 5 wherein a fluid seal is carried within a groove formed between said hub and said flange means on said nut.

7. In a centrifugal pump having a casing forming an annular chamber between fluid inlet and outlet, a rotatable pump shaft coaxial with the chamber, an impeller in the chamber and mounted against a shoulder carried on the pump shaft, a nut releaseably mounted upon a threaded portion of the pump shaft for holding the impeller against the shoulder, and key means for interconnecting the impeller and pump shaft into a nonrotating assembly, the improvement comprising:
   (a) said impeller having a central hub with a central opening forming an annulus between said hub and said pump shaft, and a first face on said hub seated against said shoulder carried on said pump shaft;
   (b) said nut having a tubular body received in said annulus between said hub and said pump shaft and said nut at one end spaced apart from said shoulder on said pump shaft;
   (c) a radial flange carried on said nut and seated against a second face on said impeller; and,
   (d) said key means comprising at least one longitudinal key received slideably in an off-center axial opening in said flange and said second face on said impeller whereby said key means axially separates upon unthreading of said nut leaving said impeller freely rotatable on said pump shaft.

8. The improved pump of claim 7 wherein said longitudinal key has a length less than the threading length of said nut on said threaded portion of said pump shaft whereby counterdirectional rotation of said pump shaft will unthread said nut from said threaded portion leaving said impeller freely rotatable on said pump shaft.

9. The improved pump of claim 7 wherein said longitudinal key is a plurality of round pins disposed about the rotational axis of said pump shaft in a dynamic balanced condition.

10. The improved pump of claim 7 wherein said longitudinal key is a pair of round pins disposed diametrically apart and at equal distances from the rotational axis of said pump shaft.

* * * * *